United States Patent
Li et al.

(10) Patent No.: US 9,546,005 B2
(45) Date of Patent: Jan. 17, 2017

(54) VOICE ROUTER

(71) Applicant: HONEYWELL INTERNATIONAL INC., Morristown, NJ (US)

(72) Inventors: Chao Li, Shanghai (CN); Lucas Chen, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/680,676

(22) Filed: Apr. 7, 2015

(65) Prior Publication Data

US 2016/0297543 A1 Oct. 13, 2016

(51) Int. Cl.
*G01C 23/00* (2006.01)
*B64D 47/00* (2006.01)
*G10L 15/22* (2006.01)
*G10L 15/26* (2006.01)

(52) U.S. Cl.
CPC ............... *B64D 47/00* (2013.01); *G10L 15/22* (2013.01); *G10L 15/26* (2013.01); *G10L 2015/223* (2013.01)

(58) Field of Classification Search
CPC ............... G08G 5/00; G05D 3/00; G05D 1/00
USPC ............... 701/3, 4, 8, 9, 11, 14, 16; 704/275
See application file for complete search history.

(56) References Cited

U.S. PATENT DOCUMENTS

| | | | |
|---|---|---|---|
| 6,965,816 B2 * | 11/2005 | Walker | B64C 13/20 244/189 |
| 7,580,377 B2 | 8/2009 | Judd | |
| 8,793,139 B1 | 7/2014 | Serban et al. | |
| 8,838,294 B2 | 9/2014 | Srivastav et al. | |
| 2007/0288128 A1 | 12/2007 | Komer et al. | |
| 2013/0197917 A1 | 8/2013 | Dong et al. | |

FOREIGN PATENT DOCUMENTS

EP 2337024 A1 6/2011

OTHER PUBLICATIONS

Rogalski, T. et al.; A concept of voice guided general aviation aircraft; Aerospace Science and Technology www.elsevier.com/locate/aescte; Aerospace Science and Technology 14 (2010) 321-328.
Extended EP Search Report for Application No. 16163062.9-1803/3079137.

* cited by examiner

*Primary Examiner* — Gertrude Arthur Jeanglaud
(74) *Attorney, Agent, or Firm* — Lorenz & Kopf, LLP

(57) ABSTRACT

A voice router for a vehicle and a method for operating a voice router are provided. The voice router, for example, may include, but is not limited to, an interface configured to be coupled to a microphone and a plurality of subsystems of an aircraft, and a processor coupled to the interface, the processor configured to receive, from the microphone, voice command audio data, convert, using an avionic language model, the voice command audio data into voice command text data, determine, using a distribution model, whether a command corresponding to the voice command text data can be executed, transmitting, to at least one of the plurality of subsystems, instructions to execute the command when the voice router determines that the command can be executed, and providing, using the output system, feedback when the command is executed.

13 Claims, 3 Drawing Sheets

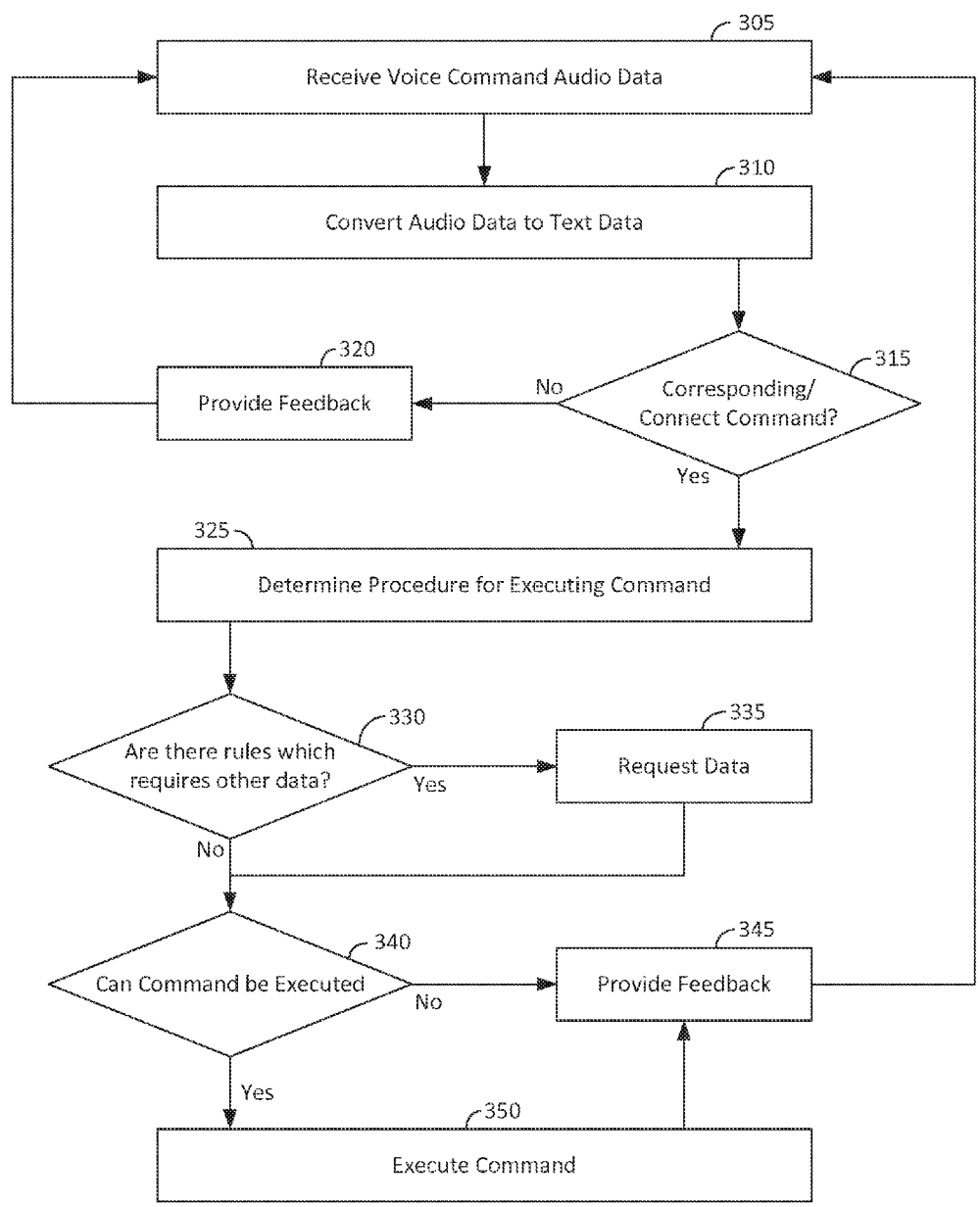

VOICE ROUTER

TECHNICAL FIELD

The present disclosure generally relates to vehicles, and more particularly relates to interface systems for vehicles.

BACKGROUND

Aircraft and other vehicles are complicated machines that take both skill and knowledge to operate. Aircraft cockpits, for example, utilize complex flight control panels, flight management systems and the like which require manual input to operate.

BRIEF SUMMARY

In one embodiment, for example, an aircraft is provided. The aircraft may include, but is not limited to, a plurality of subsystems, an interface device, and a voice router communicatively coupled to the interface device and the plurality of subsystem, the voice router configured to receive, from the interface device, voice command audio data, convert, using an avionic language model, the voice command audio data into voice command text data, determine, using a distribution model, whether a command corresponding to the voice command text data can be executed, and transmit, to at least one of the plurality of subsystems, instructions to execute the command when the voice router determines that the command can be executed.

In another embodiment, a method for controlling an aircraft is provided. The method may include, but is not limited to receiving, by a voice router, audio data, determining, by the voice router, a command corresponding to the audio data based upon an avionic language model, determining, by the voice router, when the command can be executed based upon a distribution model, and executing, when the voice router determines that the command can be executed, the command.

In yet another embodiment, a voice router is provided. The voice router may include, but is not limited to, an interface configured to be coupled to a microphone and a plurality of subsystems of an aircraft, and a processor coupled to the interface, the processor configured to receive, from the microphone, voice command audio data, convert, using an avionic language model, the voice command audio data into voice command text data, determine, using a distribution model, whether a command corresponding to the voice command text data can be executed, transmitting, to at least one of the plurality of subsystems, instructions to execute the command when the voice router determines that the command can be executed, and providing, using the output system, feedback when the command is executed.

BRIEF DESCRIPTION OF THE DRAWINGS

The detailed description will hereinafter be described in conjunction with the following drawing figures, wherein like numerals denote like elements, and wherein:

FIG. 3 is a flow diagram illustrating an exemplary method for operating the voice router, in accordance with an embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with one embodiment, a voice router for an aircraft or other vehicle is provided. The voice router acts as an interface between the operator of the vehicle and a multitude of subsystems of a vehicle. As discussed in further detail below, the voice router analyzes whether a voice command can be executed based upon a set of rules. When the voice router determines that a voice command can be executed, the voice router generates instructions for one or more subsystems of the vehicle to implement the voice command. Accordingly, the voice router provides a simple, intuitive and safe interface to operate a vehicle while also reducing the manual input required from a user to operate the vehicle.

Figure 1:
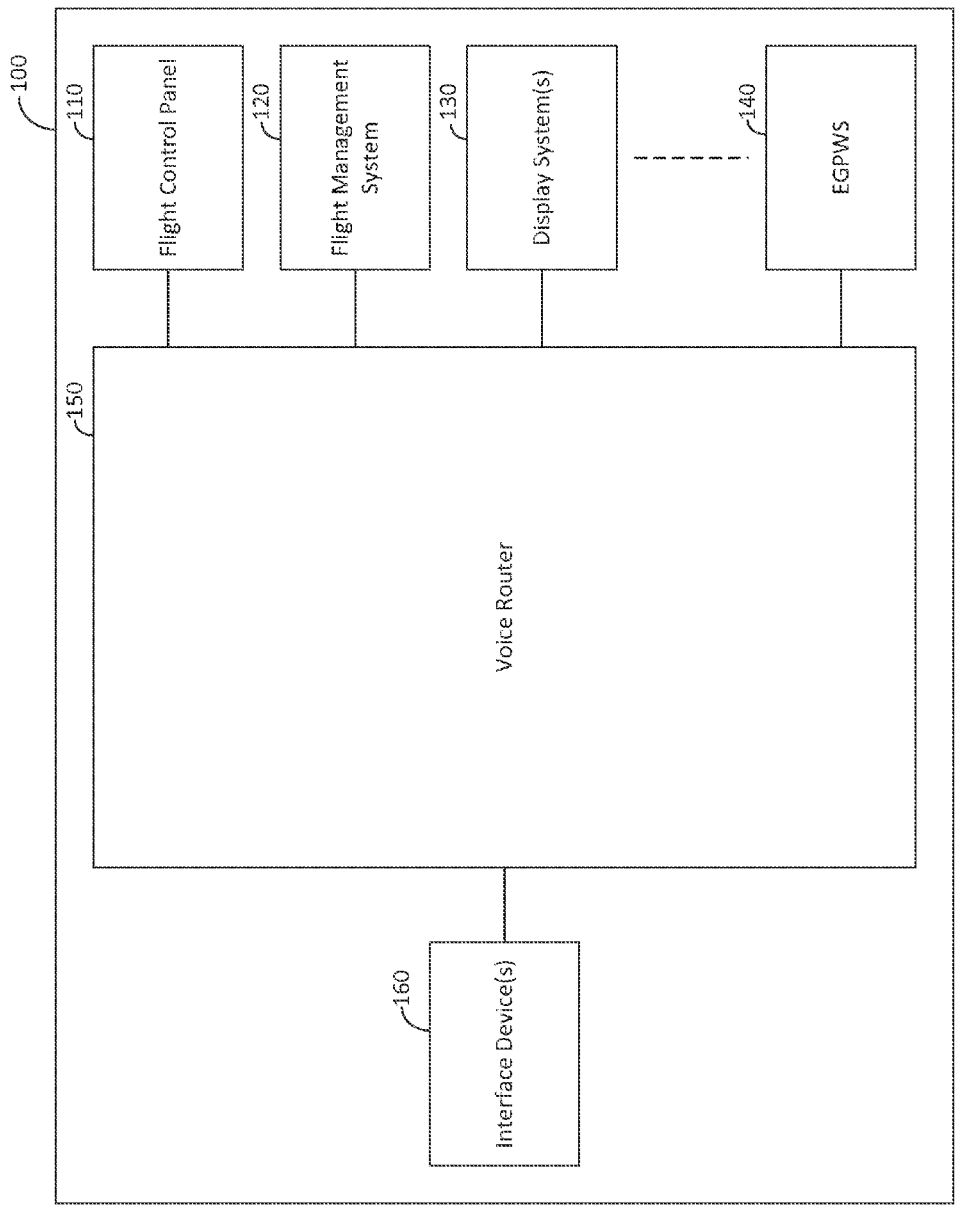
FIG. 1 is a block diagram of an exemplary vehicle in accordance with an embodiment.

FIG. 1 is a block diagram of an exemplary aircraft 100 in accordance with an embodiment. The aircraft 100 may be an airplane, a helicopter, a drone or the like. The aircraft 100 may have numerous integrated and/or standalone subsystems, possibly including, but not limited to, one or more of a flight control panel 110, a flight management system 120, one or more display systems 130, an enhanced ground proximity warning system 140, or the like. Each of the subsystems may include a dedicated or shared interface for communicating with a voice router 150. The dedicated or shared interface may be a hardware interface, a software interface (e.g., a UI layer), or a combination thereof.

The flight control panel 110 can include elements of the cockpit of the aircraft which control the aircraft as well as receive sensor data for tracking and displaying data corresponding to the aircraft. As discussed in further detail below, the sensor data tracking, for example, the speed, altitude, heading, and the like, is used to evaluate whether certain voice commands can be executed.

The flight management system 120 is a system that automates a wide variety of in-flight tasks, reducing the workload on the flight crew to the point that modern civilian aircraft no longer carry flight engineers or navigators. A primary function of the flight management system 120 is in-flight management of the flight plan for the aircraft 100. Using various sensors (such as GPS and INS often backed up by radio navigation) to determine the aircraft's position, the FMS can guide the aircraft 100 along the flight plan. From the cockpit, the flight management system 120 is normally controlled through a Control Display Unit (CDU) which incorporates a small screen and keyboard or touchscreen. As discussed in further detail below, the voice command system discussed herein allows the crew of the aircraft 100 to verbally interact with the flight management system 120, reducing or eliminating the requirement to manually interact with the CDU of the flight management system 120.

The display system(s) 130 may be part of the flight control panel, part of the flight management system, part of another single subsystem of the aircraft 100, used by multiple subsystem, or may be a display used only by the voice command system discussed herein. In one embodiment, for example, the display system 130 may include a Electronic Flight Instrument System (EFIS), a Navigation Display (ND), and/or a Multifunction Display (MFD). However, the display system 130 may include any type and configuration of displays. As discussed in further detail below, the display systems may be used to provide feedback to crew members of the aircraft 100.

The aircraft 100 further includes a voice router 150. As discussed in further detail below, the voice router 150 connects a crew member of the aircraft 100 to one or more of the subsystems of the aircraft 100 using voice commands. The crew member may interface with the voice router 150 utilizing one or more interface devices 160. The interface devices may include, but are not limited to, microphones, speakers or the like.

Figure 2:
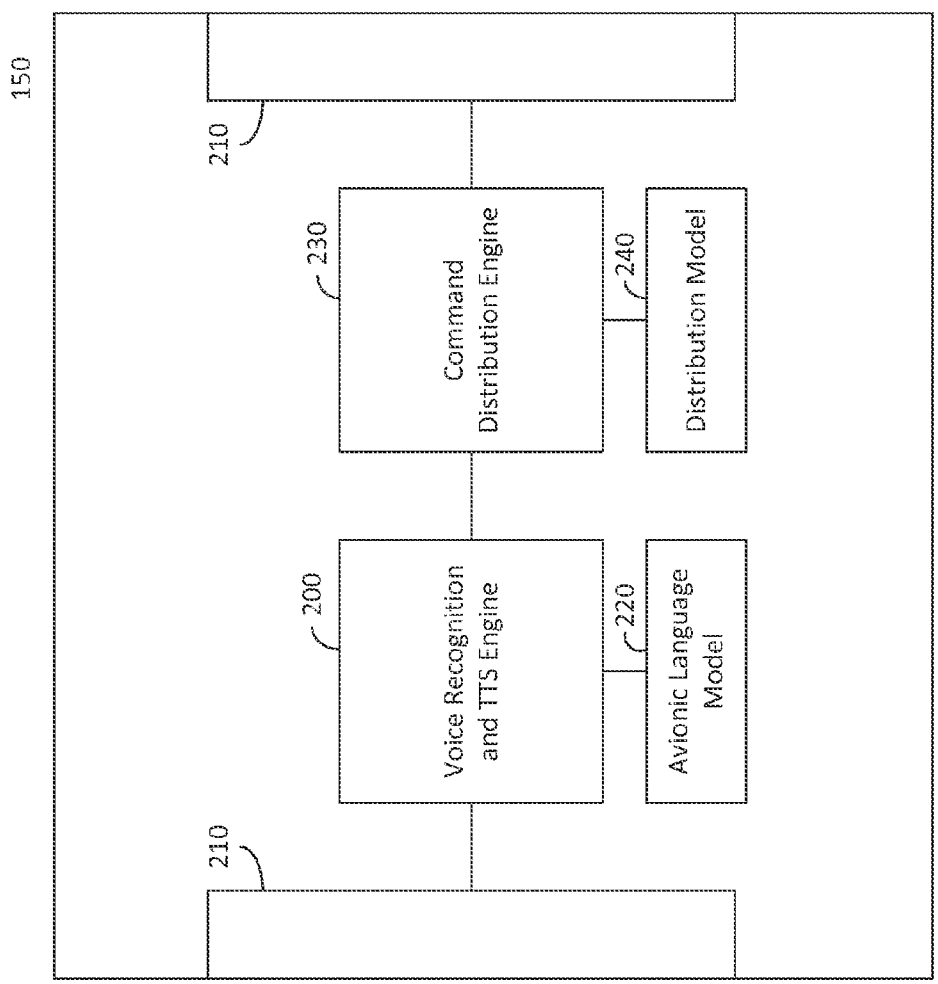
FIG. 2 is a block diagram of a voice router, in accordance with an embodiment.

FIG. 2 is a block diagram of a voice router 150, in accordance with an embodiment. The voice router 150 includes a voice recognition and text to speech engine 200, hereinafter referred to as the VRTTS engine 200. In one embodiment, for example, VRTTS engine 200 may include a processor. The processor may be, for example, a central processing unit (CPU), an application specific integrated circuit (ASIC), a microcontroller, a field programmable gate array (FPGA), or any other logic device or combination thereof. The VRTTS engine 200 may be a standalone system, or may share one or more components with other subsystems of the aircraft 100 or other components of the voice router 150.

The VRTTS engine 200 is coupled to the interface device(s) 160 via one or more input/output I/O interfaces 210. The I/O interfaces 210 may include, but are not limited to A429, A664, CAN, ASCB, Ethernet, USB, or the like.

The VRTTS engine 200 receives voice command audio data from an I/O interface 210 and converts the audio data into text data using speech recognition techniques. In one embodiment, for example, the VRTTS engine 200 may convert audio data from an I/O interface 210 into a voice command. Table 1 provides a list of possible voice commands the VRTTS engine could recognize.

TABLE 1

| Voice Command | Voice Command Parameter |
| --- | --- |
| cycle navigation database | NONE |
| enter company route | STRING |
| enter original airport | STRING |
| enter destination airport | STRING |
| activate flight plan | STRING |
| accept change | NONE |
| reject change | NONE |
| enter gross weight | FLOAT |
| enter reserve fuel | FLOAT |
| enter cruise altitude | FLOAT |
| enter cost index | INTEGER |
| enter flight number | INTEGER |
| enter waypoint | STRING |
| delete waypoint | STRING |
| forward waypoint | STRING |
| set inhibit navigation station | STRING |
| clear inhibit navigation station | NONE |
| radio tune | STRING |
| direct to | STRING |
| dial clearance altitude | FLOAT |
| hold at waypoint | STRING |
| exit hold at waypoint | STRING |

TABLE 1-continued

| Voice Command | Voice Command Parameter |
| --- | --- |
| enter offset left | FLOAT |
| enter offset right | FLOAT |
| change offset | FLOAT |
| delete offset | NONE |
| go around now | NONE |
| takeoff now | NONE |
| arm lateral guidance | NONE |
| arm vertical guidance | NONE |
| arm auto pilot | NONE |
| disarm auto pilot | NONE |
| arm auto throttle | NONE |
| disarm auto pilot | NONE |
| arm flight director | NONE |
| disarm flight director | NONE |
| fly heading | FLOAT |
| hold current heading | FLOAT |
| dial speed | FLOAT |
| dial vertical speed | FLOAT |
| hold current altitude | FLOAT |
| flight level change | FLOAT |

The first column of table 1 indicates a voice command. The second column of table 1 indicates a voice command parameter expected to be received with the voice command. The voice command parameters may provide additional data for the voice command. For example, the voice command "enter cruise altitude" would be followed with a floating point number corresponding to desired cruise altitude (e.g., 32000 feet). The voice command parameters can include, but are not limited to, an integer number, a floating point number, or a string. As indicated in table 1, not every command requires a voice command parameter. For example, the voice command "arm auto pilot" indicates that the crew member wants the aircraft's autopilot system to engage which requires no further data parameter from the crew member.

In one embodiment, for example, the VRTTS engine 200 may utilize an avionic language model 220 to convert the audio data into a voice command. The avionic language model 220 may be stored in any form of memory. The avionic language model 220 includes grammar data and vocabulary data specific to the avionic industry and to the specific voice commands the voice router 150 is intended to implement. For example, the "enter original airport" or "enter destination airport" may have a data entry in the avionic language model similar to table 2 below.

TABLE 2

| Command | enter (original | destination) airport |
| --- | --- |
| Grammar and Vocabulary | enter (original | destination) airport <voicao> <voicao> = (<char> | <phonic>) (<char> | <phonic>) (<char> | <phonic>) (<char> | <phonic>); <char> = a | b | c | d | e | f | g | h | i | j | k | l | m | n | o | p | q | r | s | t | u | v | w | x | y | z; <phonic> = alpha | bravo | charlie | delta | echo | foxtrot | golf | hotel | india | juliet | kilo | lima | mike | november | oscar | papa | quebec | romeo | sierra | tango | uniform | victor | whiskey | xray | yankee | zulu; |
| Example | Enter Original Airport k b f i or Enter Original Airport kilo bravo foxtrot india |

As another example, table 3 illustrates a possible data entry in the avionic language model 220 for the commands enter gross weight and enter reserve fuel.

TABLE 3

| | |
|---|---|
| Command | enter (gross weight \| reserve fuel) |
| Grammar and Vocabulary | enter (gross weight \| reserve fuel) <vomass><br><vomass> = <voonetothousand> thousand;<br><voonetothousand> = [<threedigits>] [<onetohundred>];<br><threedigits> = <singledigit> hundred;<br><onetohundred> = ([<doubledigits>] [<singledigit>]) \| <digits>;<br><singledigit> = one \| two \| three \| four \| five \| six \| seven \| eight \| nine;<br><doubledigits> = ten \| twenty \| thirty \| forty \| fifty \| sixty \| seventy \| eighty \| ninety;<br><digits> = eleven \| twelve \| thirteen \| fourteen \| fifteen \| sixteen \| seventeen \| eighteen \| nineteen; |
| Example | Enter Gross Weight six hundred thousand or Enter Reserve Fuel sixteen thousand |

Commands without voice command parameters would have simpler data entry in the avionic language model 220. For example, the command "cycle navigation database" may have a data entry in the avionic language model 220 according to table 4.

TABLE 4

| | |
|---|---|
| Command | cycle navigation database |
| Example | cycle navigation database |

In the embodiment illustrated in table 4, the only acceptable voice command to initiate a cycle of the navigational database is the command "cycle navigation database." In other words, the crew member has to speak the exact words "cycle navigation database." However, more options could be given. For example, the data entry in the avionic language model 220 could be modified to accept both "cycle navigation database" and "cycle the navigation database," or other variations thereof.

The VRTTS engine 200 also includes a text to speak engine. As discussed in further detail below, the voice router 150 may provide audio feedback to the crew based upon the success or failure of the voice router 150 to understand and execute the command spoken by the crew. The VRTTS engine 200, in these embodiments, may convert textual feedback generated by the voice router 150 into audio feedback for the crew. Any synthesizer engine could be utilized to generate the audio feedback, including, but not limited to, a concatenation synthesis engine, a formant synthesis engine, an articulatory synthesis engine, a sinewave synthesis engine, a hidden Markoc model synthesis engine, or any combination thereof.

The VRTTS engine 200 passes any received audio voice command as textual data to a command distribution engine 230. In one embodiment, for example, command distribution engine 230 may include a processor. The processor may be, for example, a central processing unit (CPU), an application specific integrated circuit (ASIC), a microcontroller, a field programmable gate array (FPGA), or any other logic device or combination thereof. The command distribution engine 230 may be a standalone system, or may share one or more components with other subsystems of the aircraft 100 or other components of the voice router 150 such as the VRTTS engine 200.

The command distribution engine 230 determines whether the voice command can be executed, and distributes instructions to one or more of the subsystems of the aircraft 100 to execute the command. In one embodiment, for example, the command distribution engine 230 may consult distribution model 240 to determine whether the voice command can be executed and which of the one or more of the subsystems of the aircraft 100 are utilized to execute the command. The distribution model 240 may be stored in any form of memory.

The distribution model 240 may include rule data including rules for executing commands, procedure data defining procedures for executing the commands and switch data defining which subsystem(s) of the aircraft 100 to issue instructions to and data defining instruction formatting for each subsystem. The rule data defines one or more parameters which much be met in order for a command to be executed. In some instances, the rules may be based upon feedback from one or more of the subsystems of the aircraft 100. For example, if the voice command is "enter cruise altitude 40000," distribution model 240 may indicate that cruise altitude is based upon a rule involving a current gross weight of the vehicle.

The procedures data defines an order of procedures in order to execute the command. The procedure data can vary depending upon the command. Using the same example above, the procedure data for the command "enter cruise altitude 40000" may be to first determine a maximum altitude of the aircraft with the aircraft current gross weight, compare the maximum altitude of the aircraft with the aircraft current gross weight against the requested altitude and execute the command or report that the command could not be executed thereupon. The switch data stored in the distribution model 240 may include data on which subsystems of the aircraft 100 can return parameters for analyzing a command, which subsystems of the aircraft 100 can execute a command, and data for formatting instructions to each of the subsystems. Using the same example of "enter cruise altitude 40000," the switch data in the distribution model 240 may indicate that the flight management system 120 is capable of calculating the maximum altitude of the aircraft with the aircraft current gross rate and the flight control panel 110 is capable of executing the command.

FIG. 3 is a flow diagram illustrating an exemplary method 300 for operating the voice router 150, in accordance with an embodiment. The method 300 begins when voice command data is received by the voice router 150. (Step 305). As discussed above, the voice router 150 may receive audio data from I/O interface 210. The voice router 150 then converts the audio data including the voice command to text data. (Step 310). Speech recognition techniques, such as hidden Markov models, dynamic time warping, neural networks, or the like could be used to transform the audio data into text data. The voice router 150 may then analyze the text data and compare the text data to possible commands in the avionic language model 220. (Step 315). As discussed above, the avionic language model 220 defines vocabulary, grammar and command parameters corresponding to all of the possible voice commands the voice router 150 is configured to respond to.

If the text data does not correspond to a known command or there is an issue with the vocabulary, grammar or command parameters associated with the command, the voice router provides feedback to the crew member. (Step 320). As discussed above, one of the interface devices 160 of the aircraft may be a speaker. Accordingly, the feedback can be audio feedback to the crew member. For example, if the crew member speaks the command "enter origin airport," the voice router 150 would determine that the command parameter (i.e., the name of the origin airport) is missing. In one embodiment, for example, the voice router 150 could output audio data indicating that the command could not be completed due to the missing command parameter. However, in another embodiment, the feedback provided by the voice router 150 could request the command parameter. In either embodiment, the voice router may return to Step 305 to await new voice data from the crew. If the crew attempts the command again, the voice router 150, in Step 315, may attempt to connect the text data to a previous command. Using the example above, if the new text data corresponds to an airport name defined in the avionic language model, the voice router 150 may connect the newly received text data with the previously received text data to complete the command. However, in other embodiments, only a single complete command meeting all of the vocabulary, grammar and command parameter requirements of the avionic language model may be accepted in Step 315.

When a complete command is received, or generated via multiple passes through steps 305-320, the voice router 150 then determines a procedure for executing the command. (Step 325). As discussed above, the voice router 150 may utilize a distribution model 240 to determine the procedure for executing the command. The procedure may include, but is not limited to, requesting data from one or more subsystems of the aircraft, analyzing one or more rules to verify that the command can be executed, and formatting instructions for issuing commands.

The voice router 150, when there are one or more rules corresponding to a command, then determines if the one or more of the rules require additional information to be processed. (Step 330). As discussed above, some rules require information from one or more of the subsystems of the aircraft 100. The additional information will obviously vary from rule to rule. In general, some examples of possible information include, current conditions of the aircraft (speed, altitude, location or the like), map data, or the like.

When the voice router 150 determines that one or more rules that need to be analyzed to execute a command requires additional information, the voice router 150 transmits a request for the additional information to the appropriate subsystem of the aircraft 100. (Step 335). As discussed above, the distribution model 240 may include switch data defining which subsystem is responsible for tracking, calculating, or storing all of the possible information requested to analyze all of the rules. The switch data may also include formatting instructions for issuing instructions to the appropriate subsystem or other instructions for acquiring the data. For example, if one of the subsystems outputs data to the voice router 150 through one of the I/O interface 210 which is dependent upon a voltage level, the switch data may indicate how to convert that voltage level into the desired data. In other instances, the switch data in the distribution model 240 may define a format for a request to calculate or otherwise obtain data from one of the subsystems.

After the data has been received from the appropriate subsystem in Step 335, or when the voice router did not need additional information to execute the command, the voice router 150 may then determine if the command can be executed. (Step 340). When there isn't a rule, the voice router 150 may skip Step 340 and immediately proceed to execute the command. When there are one or more rules, the voice router 150 evaluates the rules according to the distribution model 240. As discussed above, the rules may be based upon a data received from one of the subsystems, including, but not limited to, speed data, altitude data, location data, heading data, ascent rate data, descent rate data, fuel data, weight data, waypoint data, or the like.

If the command cannot be executed based upon the analysis of the rule(s), the voice router 150 provides feedback to the crew. (Step 345). In one embodiment, for example, the feedback may be audio feedback in the form of text to speech or prerecorded messages. In another embodiment, for example, visual feedback on a display system 130 of the aircraft can be given. However, any combination of audio and visual feedback may be provided. In one embodiment, for example, the feedback may only include a notification that the command could not be completed. However, in other embodiments, the feedback may include a reason why the command could not be completed. In other words, the feedback may indicate one or more rules that were violated and why. Using the example above for the command "enter cruise altitude 40000" having the rule based upon the current gross weight of the aircraft, the feedback may be "The command could not be completed. The requested altitude of 40,000 feet exceeds a maximum allowable altitude based upon the current gross weight of the aircraft."

When the voice router 150 determines that the command can be completed, the voice router executes the command. (Step 350). As discussed above, the distribution model 240 stores data indicated procedures for executing the commands. The procedures indicate which subsystem(s) are responsible for executing the commands, an order of which the command instructions should be issued to the subsystem(s) in order to execute the command, and any formatting instructions for communicating with the appropriate subsystems. The voice router 150 may then provide feedback to the crew to indicate that the command was executed. (Step 345). After the feedback is provided in Step 345, the process returns to Step 305 to await another voice command.

Because the voice router 150 utilizes an avionic language model 220 to determine the command and analyzes whether or not the command can be executed utilizing the distribution model 240, the voice router 150 provides a safe and reliable verbal interface to the subsystems of the aircraft, by only executing voice commands when the voice commands accurately match the grammar, vocabulary and voice parameter requirements defined in the avionic language model 220 and all of the safety rules for executing the command are met.

While the above description discussed a voice router for an aircraft 100, the voice router could be implemented in any type of vehicle or system, including, but not limited to, automobiles, spacecraft, watercraft or the like.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft, comprising:
 a plurality of subsystems;
 an interface device; and
 a voice router communicatively coupled to the interface device and to at least one of the plurality of subsystems, the voice router configured to:

receive, from the interface device, voice command audio data;

convert, using an avionic language model, the voice command audio data into voice command text data;

determine, when one or more safety rules are associated with a command corresponding to the voice command text data, whether the command can be executed by determining which one or more of the plurality of sub systems controls data associated with the one or more safety rules;

transmit a request for data associated with the one or more safety rules to the one or more of the plurality of sub systems;

evaluate the one or more safety rules based upon data received from the one or more of the plurality of sub systems in response to the request; and transmit, to at least one of the plurality of subsystems, instructions to execute the command when the voice router determines that the command can be executed safely based upon the evaluated one or more safety rules.

2. The aircraft of claim 1, wherein the voice router determines from which of the at least one of the plurality of subsystems to request the data for evaluating the safety rule based upon a distribution model.

3. The aircraft of claim 2, wherein the distribution model controls procedures for executing the command.

4. The aircraft of claim 1, wherein when the voice router determines that the command cannot be executed, the voice router outputs audio feedback.

5. The aircraft of claim 1, wherein the avionic language model defines vocabulary, grammar and command parameters for a plurality of voice commands.

6. The aircraft of claim 5, wherein the converting the voice command audio data into voice command text data further comprises:

performing speech recognition upon the voice command audio data; and determining the voice command text data based upon an output of the speech recognition and the vocabulary, grammar and command parameters for the plurality of voice commands.

7. A method for controlling an aircraft, comprising:

receiving, by a voice router, audio data;

determining, by the voice router, a command corresponding to the audio data based upon an avionic language model;

determining, by the voice router when one or more safety rules are associated with the command, whether the command can be executed by determining which one or more of a plurality of sub systems controls data associated with the one or more safety rules;

transmitting, by the voice router, a request for data associated with the one or more safety rules to the one or more of the plurality of sub systems;

evaluating, by the voice router, the one or more safety rules based upon data received from the one or more of the plurality of sub systems in response to the request; and executing, when the voice router determines that the command can be executed safely based upon the evaluated one or more safety rules, the command.

8. The method of claim 7, wherein the determining the command further comprises:

performing, by the voice router, speech recognition on the audio data to convert the audio data into text data; and correlating, by the voice router, the text data to the command based upon grammar, vocabulary and command parameters of the text data to determine the command.

9. The method of claim 7, wherein the transmitting further comprises:

determining, by the voice router, a format for instructing the at least one subsystem using the distribution model; and transmitting, by the voice router, the request for data to the at least one subsystem of the aircraft according to the format.

10. The method of claim 7, wherein the executing further comprises:

determining, determining, by the voice router, a format for instructing the at least one subsystem to execute the command using the distribution model; and transmitting, by the voice router, the instruction to execute the command to the at least one subsystem of the aircraft.

11. A voice router, comprising:

an interface configured to be coupled to a microphone and a plurality of subsystems of an aircraft; and a processor coupled to the interface, the processor configured to receive, from the microphone, voice command audio data;

convert, using an avionic language model, the voice command audio data into voice command text data;

determine, when one or more safety rules are associated with a command corresponding to the voice command text data, whether the command can be executed by determining which one or more of the plurality of sub systems controls data associated with the one or more safety rules;

transmit a request for data associated with the one or more safety rules to the one or more of the plurality of sub systems;

evaluate the one or more safety rules based upon data received from the one or more of the plurality of sub systems in response to the request;

transmitting, to at least one of the plurality of subsystems, instructions to execute the command when the voice router determines that the command can be safely executed based upon the evaluated one or more safety rules; and providing, using the output system, feedback when the command is executed.

12. The voice router of claim 11, wherein the avionic language model defines vocabulary, grammar and command parameters for a plurality of voice commands.

13. The voice router of claim 12, wherein the converting the voice command audio data into voice command text data further comprises:

performing speech recognition upon the voice command audio data; and determining the voice command text data based upon an output of the speech recognition and the vocabulary, grammar and command parameters for the plurality of voice commands.

* * * * *